United States Patent
Raemy et al.

(10) Patent No.: US 11,468,336 B2
(45) Date of Patent: Oct. 11, 2022

(54) SYSTEMS, DEVICES, AND METHODS FOR IMPROVED AFFIX-BASED DOMAIN NAME SUGGESTION

(71) Applicant: VERISIGN, INC., Reston, VA (US)

(72) Inventors: Vincent Raemy, Fribourg (CH); Aubry Cholleton, Fribourg (CH)

(73) Assignee: VeriSign, Inc., Reston, VA (US)

( * ) Notice: Subject to any disclaimer, the term of this patent is extended or adjusted under 35 U.S.C. 154(b) by 1775 days.

(21) Appl. No.: 15/174,530

(22) Filed: Jun. 6, 2016

(65) Prior Publication Data

US 2017/0351953 A1      Dec. 7, 2017

(51) Int. Cl.
| | |
|---|---|
| G06N 3/08 | (2006.01) |
| G06N 20/00 | (2019.01) |
| H04L 61/3015 | (2022.01) |
| G06F 40/284 | (2020.01) |
| H04L 61/4511 | (2022.01) |
| H04L 101/604 | (2022.01) |

(52) U.S. Cl.
CPC ........... G06N 3/088 (2013.01); G06F 40/284 (2020.01); G06N 20/00 (2019.01); H04L 61/3025 (2013.01); H04L 61/4511 (2022.05); H04L 2101/604 (2022.05)

(58) Field of Classification Search
CPC ...... G06N 3/088; G06N 20/00; G06F 40/284; H04L 61/1511; H04L 61/3025; H04L 61/4511
See application file for complete search history.

(56) References Cited

U.S. PATENT DOCUMENTS

| | | | |
|---|---|---|---|
| 9,787,634 B1* | 10/2017 | Lai | ...................... H04L 61/3025 |
| 2002/0065903 A1 | 5/2002 | Fellman | |
| 2015/0039599 A1* | 2/2015 | Carroll | .................... G06F 40/58 |
| | | | 707/724 |

FOREIGN PATENT DOCUMENTS

WO         01/22286 A1     3/2001

OTHER PUBLICATIONS

Chen, Welin, David Grangier, and Michael Auli. "Strategies for training large vocabulary neural language models." arXiv preprint arXiv:1512.04906 (Dec. 2015). (Year: 2015).*
Yoshua Bengio et al., "A neural probabilistic language model", The Journal of Machine Learning Research 3, 2003, pp. 1137-1155.
Dan Jurafsky, "Language Modeling: Introductions to N-grams", Stanford University Natural Language Processing, retrieved May 6, 2016, pp. 1-88.
Tomas Mikolov et al., "Efficient Estimation of Word Representations in VectorSpace." arXiv preprint arXiv:1301.3781 2013, pp. 1-12.

(Continued)

*Primary Examiner* — Benjamin P Geib
(74) *Attorney, Agent, or Firm* — Baker Botts L.L.P.; Michael A. Sartori (57) ABSTRACT

Embodiments relate to systems, devices, and computing-implemented methods for generating domain name suggestions by obtaining a domain name suggestion input that includes textual data, segmenting the textual data into tokens, obtaining a list of possible affixes to the textual data, determining conditional probabilities for the possible affixes using a language model, ranking the list of possible affixes based on the conditional probabilities to generate a ranked list of affixes, and generating domain name suggestions based on the ranked list of affixes.

17 Claims, 7 Drawing Sheets

(56) References Cited

OTHER PUBLICATIONS

Wang Ling et al., "Two/Too Simple Adaptations of Word2Vec for Syntax Problems" Proceedings of the North American Chapter of the Association for Computational Linguistics (NAACL), 2015, pp. 1-6.
Frederic Morin et al., "Hierarchical Probabilistic Neural Network Language Model." AISTATS, vol. 5, 2005, pp. 1-7.
Yoshua Bengio et al., "Quick Training of Probabilistic Neural Nets by Importance Sampling." AISTATS, 2003, pp. 1-9.
Extended European Search Report dated Nov. 8, 2017, European Application No. 17174532.6, pp. 1-7.
Communication pursuant to Article 94(3) EPC dated Mar. 17, 2021 in corresponding European Application No. 17174532.6, 6 pages.

\* cited by examiner

SYSTEMS, DEVICES, AND METHODS FOR IMPROVED AFFIX-BASED DOMAIN NAME SUGGESTION

BACKGROUND

Domain names are hostnames that identify Internet Protocol (IP) resources, such as web sites. Users who are owners of content to be presented on web sites often desire a descriptive domain name for their web site that suggests or relates to the web site's content. Other factors may also be desirable in a domain name, such as ease of memorizing the domain name, ease of typing, applicability across many languages and regions, search engine optimization, and length. Thus, a user may desire to register a domain name for a sports web site containing, for example, a sports term or theme. The process of domain name selection can be tedious since a user must often consider many different combinations of terms to create a desirable domain name. Even after a potential domain name is selected, it may be registered to another user or otherwise may not be available.

Domain name suggestion systems can provide potentially desirable domain names to a user by automatically generating domain name suggestions using an input string corresponding to the user's desired domain name. Domain name suggestion systems determine available domain names that relate to the input string, and can assign a value to one or more affixes based on the input string. For example, a value can be associated with an affix and a particular position relative to the input string (e.g., before the input string (prefix), within the input string, or after the input string (suffix)).

However, current domain name suggestion systems may base the suggestion on occurrences of the affix with the input string in a training set (e.g., using maximum likelihood estimates based on occurrences of the sequence), and are unable and/or have difficulty in assigning a value to affixes that do not occur with the input string in the training set.

Therefore, there is a need for systems and methods that provide improved affix-based domain name suggestion.

SUMMARY

The present disclosure relates to systems, devices, and methods for generating domain name suggestions by obtaining a domain name suggestion input that includes textual data, segmenting the textual data into tokens, obtaining a list of possible affixes to the textual data, determining conditional probabilities for the possible affixes using a language model, ranking the list of possible affixes based on the conditional probabilities to generate a ranked list of affixes, and generating domain name suggestions based on the ranked list of affixes.

In various embodiments, a single token can represent one word or multiple words.

In an embodiment, the list of possible affixes can include generic top level domains.

In an embodiment, the language model can be trained using a training set of textual data.

In an embodiment, the list of possible affixes can include words from the training set of textual data.

In an embodiment, the language model can be a feed-forward neural network with one or more non-linear hidden layers.

In an embodiment, the language model can be a log-linear language model.

In an embodiment, the training set of textual data can be a domain name system zone file.

In an embodiment, the conditional probabilities can be position dependent.

In an embodiment, the conditional probabilities can be position independent.

In an embodiment, the domain name suggestions can be generated based on top ranked affixes.

In an embodiment, the domain name suggestion can be generated based on affixes associated with conditional probabilities that meet or exceed a threshold.

In an embodiment, the domain name suggestions can be displayed in a browser.

BRIEF DESCRIPTION OF THE DRAWINGS

The accompanying drawings, which are incorporated in and constitute a part of this specification, illustrate various embodiments of the present disclosure and together, with the description, serve to explain the principles of the present disclosure. In the drawings.

DETAILED DESCRIPTION

The following detailed description refers to the accompanying drawings. Wherever convenient, the same reference numbers are used in the drawings and the following description to refer to the same or similar parts. While several examples of embodiments and features of the present disclosure are described herein, modifications, adaptations, and other implementations are possible, without departing from the spirit and scope of the present disclosure. Accordingly, the following detailed description does not limit the present disclosure. Instead, the proper scope of the disclosure is defined by the appended claims.

Current domain name suggestion systems can generate domain name suggestions by adding an affix to an input string of words from a user (e.g., before the input string (prefix), within the input string, or after the input string (suffix)). As used herein, a word can represent one or more words, phrases, symbols, or other meaningful lexical elements that can be used in a domain name. As used herein, an affix can represent one or more words that can be added to a string of words to, for example, create a unique domain name.

Selecting appropriate affixes is a complex technical task that involves using natural language processing (NLP) to determine affixes that are semantically and syntactically appropriate based on the input string.

Traditional language models rely heavily on examples in the training set to assign values to the affixes relative to the input string. For example, a value can be assigned to an affix by dividing the number of occurrences of the input string with the affix in the training set by the total number of occurrences of the input string in the training set (e.g., maximum likelihood estimates). However, because traditional language models lack the technical ability to smooth the language model, the systems may not be able to determine a value if there are no occurrences of the input string with the affix in the training set.

Accordingly, in some embodiments, the domain name suggestion system can be configured to use a neural network language model (e.g., a feed-forward neural network language model) with one or multiple non-linear hidden layers or a log-linear language model that learns a continuous distributed representation of words and multi-word expressions. Thus, such domain name suggestion systems have the technical ability to efficiently process the training set to generate a smooth language model and return more accurate results. Therefore, the use of a neural network language model with one or more multiple non-linear hidden layers or a log-linear language model are technical improvements to the operations of domain name suggestion systems.

Additionally, using a smoothed language model allows the use of a domain name system (DNS) zone file as a training set. A zone file is useful as a training set for domain name suggestion because a zone file contains already registered domain names, which can be effective indications of the semantics and syntax of desirable domain names.

However, a zone file may only include registered domain names, and domain name suggestion systems should suggest domain names that are not registered. Accordingly, values can be assigned to affix/input string combinations that do not occur in the zone file. Thus, without using a smooth language model, it may be difficult to assign values to affix/input string combinations because there may be no occurrences of the affix/input string combinations in the zone file.

Therefore, a domain name suggestion system that use a neural network language model with one or multiple non-linear hidden layers or a log-linear language model that learns a continuous representation of words and multi-word expressions (a smoothed language model) allows the use of a zone file notwithstanding the very low amount of context that the zone file provides.

Figure 1:
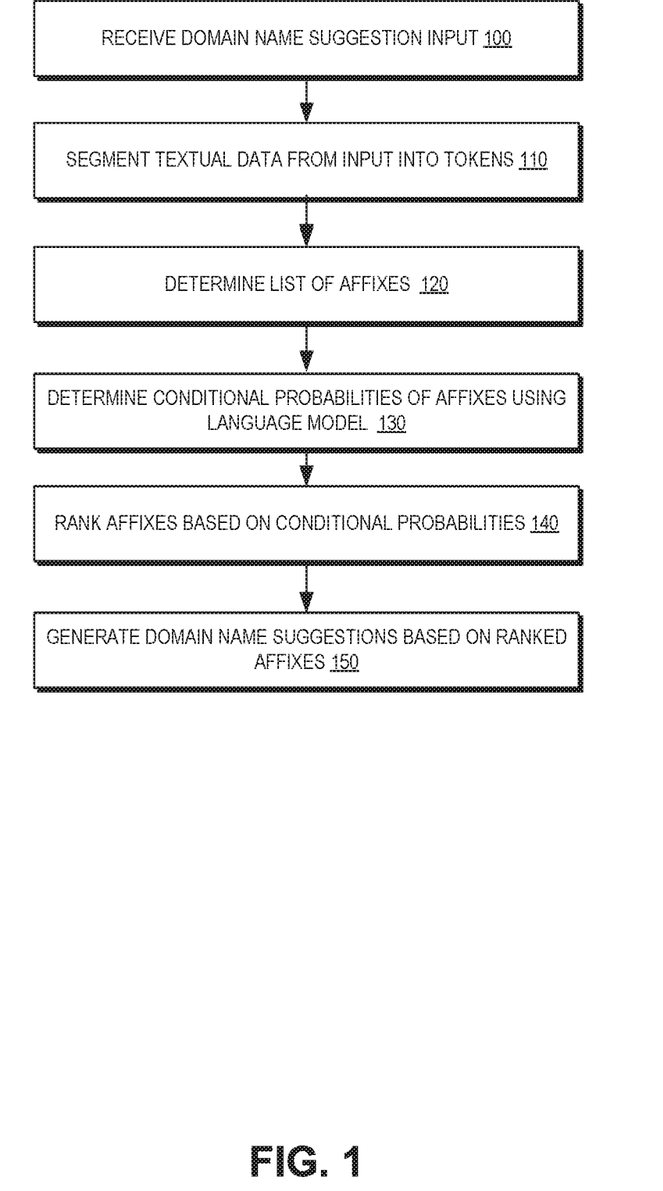
FIG. 1 is a flow diagram illustrating an example process for generating domain name suggestions, consistent with certain disclosed embodiments.

FIG. 1 is a flow diagram illustrating an example process for generating domain name suggestions, consistent with certain disclosed embodiments. In some embodiments, the method described in FIG. 1 can be performed using a computing device such as, for example, a database server, a web server, a mainframe computer, a distributed cluster of computing nodes and/or graphics processing units (GPUs), etc.

In some embodiments, the computing device can be, for example, a domain name registry and/or a name server, and can maintain and/or have access to a database of domain name records. In other embodiments, the computing device can be, for example, a domain name registrar that manages the reservation of domain names.

The process can begin in 100, when the computing device receives domain name suggestion input. The domain name suggestion input can include textual data representing keywords and/or a domain name. For example, after determining that a desired domain name is unavailable, a user can input the textual data to determine similar domain names that are available. As an additional example, the textual data can be input automatically when the user attempts to register and/or search for an already registered domain.

In some embodiments the textual data can include both a second-level domain (SLD) and a top-level domain (TLD) of a desired domain name (e.g., italianrestaurant.com). In other embodiments, the textual data can simply include the desired SLD or keywords associated with the desired SLD (e.g., italianrestaurant or Italian restaurant).

In further embodiments, the domain name suggestion input can additionally include, for example, one or more desired TLDs for the domain name (e.g., .com, .org, .net, etc.), a desired language of the domain name, etc.

In 110, the computing device can segment the textual data from the domain name suggestion input into tokens. In some embodiments, the computing device can segment the textual data into tokens using a tokenization algorithm. Thus, each token can represent one or more words or other meaningful elements within the textual data. In further embodiments, the computing device can identify collocations within the textual data that represent two or more words (e.g., bigrams) that are routinely juxtaposed. Collocations can be segmented as single tokens. Additionally, in various embodiments, collocations can be identified from a pre-built dictionary of collocations that is built using pointwise-mutual information measurements among bigrams in a training set of textual data (e.g., an online encyclopedia, a zone file, etc.).

In 120, the computing device can determine a list of possible affixes to add to the textual data. In some embodiments, the list of possible affixes can be based on words in a dictionary for a selected language and/or a determined language of the textual data, words from a dictionary with a selected syntactical function (e.g., adjectives), words from domain names in a zone file, etc.

In 130, the computing device can determine conditional probabilities of affixes in the list of possible affixes. A conditional probability can represent a value assigned to the affix, where the value indicates the likelihood that adding the affix to the textual data results in a desirable domain name. In some implementations, conditional probabilities may only be computed for affixes that result in an available domain name when added to the textual data.

In some embodiments, the affixes can be assigned a unique conditional probability for different positions within the textual data (position dependent). For example, adding the affix as a prefix to the textual data can be assigned a first conditional probability, adding the affix between two particular words in the textual data can be assigned a second conditional probability, and adding the affix as a suffix to the textual data can be assigned a third conditional probability.

In further embodiments, a conditional probability can be assigned to an affix without being associated with a position (position independent).

In various embodiments, the conditional probabilities can be assigned to the affixes using a language model. Additionally, in some embodiments, the language model can be a neural network language model with one or multiple non-linear hidden layers or a log-linear language model. Training a language model and assigning conditional probabilities to the affixes are described in further detail below with regard to FIG. 3.

In 140, the computing device can rank the affixes based on the assigned conditional probabilities. For example, the affix assigned the highest conditional probability can be ranked first, and the affix assigned the lowest conditional probability can be ranked last.

Additionally, in some embodiments, the conditional probabilities can be position dependent. Accordingly, the computing device can rank affix/position combinations based on the assigned conditional probabilities.

In 150, the computing device can generate domain name suggestions based on the ranked affixes. In some embodiments, the computing device can select K affixes, where K is a predetermined number (e.g., selected by the user, predetermined by a system administrator, hardcoded into the system, etc.). The computing device can then generate domain name suggestions based on the top K affixes in the ranking of affixes.

For example, if the textual data is "italianrestaurant.com" and the affix "best" in the prefix position is the top ranked affix, the computing device can generate the domain name suggestion "bestitalianrestaurant.com."

In other embodiments, the computing device can compare the conditional probabilities to a threshold and generate domain name suggestions based on the affixes with conditional probabilities that meet or exceed the threshold.

In some implementations, the generated domain name suggestions can be displayed to the user. For example, the generated domain name suggestions can be displayed in a browser, as shown with regard to FIG. 4.

While the steps depicted in FIG. 1 have been described as performed in a particular order, the order described is merely an example, and various different sequences of steps can be performed, consistent with certain disclosed embodiments. Additionally, the steps are described as discrete steps merely for the purpose of explanation, and, in some embodiments, multiple steps may be performed simultaneously and/or as part of a single computation. Further, the steps described are not intended to be exhaustive or absolute, and various steps can be inserted or removed.

The steps depicted in FIG. 1 can be used to generate SLDs, which can, in various embodiments, be combined with predetermined TLDs (e.g., .com, .net, .org, etc.) to generate the domain name suggestions. However, in some embodiments, a computing device can generate domain name suggestions using affixes that are contextually relevant generic TLDs (gTLDs) such as, for example, .recipes, .menu, .catering, .name, etc. Generating domain name suggestions using contextually relevant gTLDs is described in further detail with regard to FIG. 2.

Figure 2:
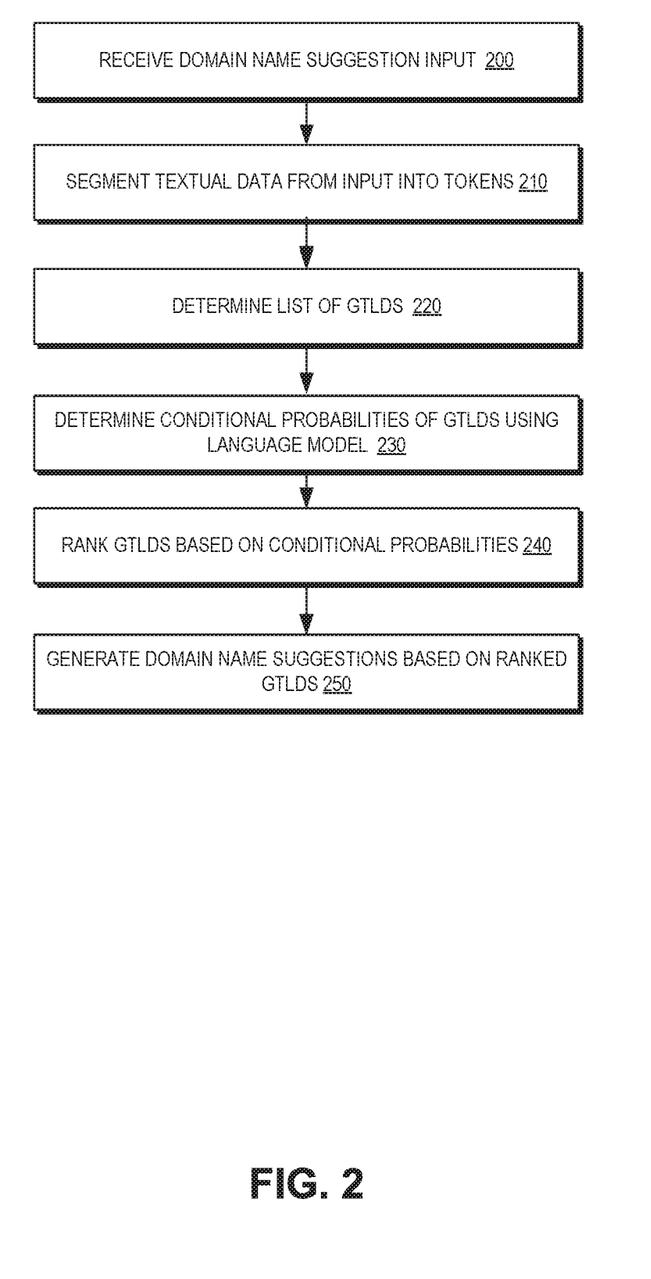
FIG. 2 is a flow diagram illustrating an example process for generating domain name suggestions, consistent with certain disclosed embodiments.

FIG. 2 is a flow diagram illustrating an example process for generating domain name suggestions, consistent with certain disclosed embodiments. In some embodiments, the method described in FIG. 2 can be performed using a computing device such as, for example, a database server, a web server, a mainframe computer, a distributed cluster of computing nodes and/or graphics processing units (GPUs), etc.

In some embodiments, the computing device can be, for example, a domain name registry and/or a name server, and can maintain and/or have access to a database of domain name records. In other embodiments, the computing device can be, for example, a domain name registrar that manages the reservation of domain names.

The process can begin in 200, when the computing device receives domain name suggestion input. The domain name suggestion input can include textual data representing keywords and/or a domain name. For example, after determining that a desired domain name is unavailable, a user can input the textual data to determine similar domain names that are available. As an additional example, the textual data can be input automatically when the user attempts to register and/or search for an already registered domain.

In some embodiments the textual data can include both an SLD and a TLD of a desired domain name (e.g., italianrestaurant.com). In other embodiments, the textual data can simply include the desired SLD or keywords associated with the desired SLD (e.g., italianrestaurant or Italian restaurant).

In further embodiments, the domain name suggestion input can additionally include, for example, one or more desired TLDs for the domain name (e.g., .com, .org, .net, etc.), a desired language of the domain name, etc.

In 210, the computing device can segment the textual data from the domain name suggestion input into tokens. In some embodiments, the computing device can segment the textual data into tokens using a tokenization algorithm. Thus, each token can represent one or more words (e.g., single words, collocations, etc.) or other meaningful elements within the textual data.

In 220, the computing device can determine a list of possible gTLDs that are available with the textual data. In some embodiments, the list of possible gTLDs can be based on the available gTLDs, words in a dictionary for a selected language and/or a determined language of the textual data, words from a dictionary with a selected syntactical function (e.g., nouns), gTLDs from domain names in a zone file, etc.

In 230, the computing device can determine conditional probabilities of gTLDs in the list of possible gTLDs. A conditional probability can represent a value assigned to the gTLD, where the value indicates the likelihood that a domain name with the textual data and the gTLD results in a desirable domain name. In some implementations, conditional probabilities may only be computed for gTLDs that result in an available domain name when added to the textual data.

In various embodiments, the conditional probabilities can be assigned to the gTLDs using a language model. Additionally, in some embodiments, the language model can be a neural network language model with one or multiple non-linear hidden layers or a log-linear language model. Training a language model and assigning conditional probabilities to the gTLDs are described in further detail below with regard to FIG. 3.

In 240, the computing device can rank the gTLDs based on the assigned conditional probabilities. For example, the gTLD assigned the highest conditional probability can be ranked first, and the gTLD assigned the lowest conditional probability can be ranked last.

In 250, the computing device can generate domain name suggestions based on the ranked gTLDs. In some embodiments, the computing device can select K gTLDs, where K is a predetermined number (e.g., selected by the user, predetermined by a system administrator, hardcoded into the system, etc.). The computing device can then generate domain name suggestions based on the top K gTLDs in the ranking of gTLDs.

For example, if the textual data is "italianrestaurant" and the gTLD "recipes" is the top ranked gTLD, the computing device generate the domain name suggestion "italianrestaurant.recipes."

In other embodiments, the computing device can compare the conditional probabilities to a threshold and generate domain name suggestions based on the gTLDs with conditional probabilities that meet or exceed the threshold.

In some implementations, the generated domain name suggestions can be displayed to the user. For example, the generated domain name suggestions can be displayed in a browser, as shown with regard to FIG. 5.

While the steps depicted in FIG. 2 have been described as performed in a particular order, the order described is merely an example, and various different sequences of steps can be performed, consistent with certain disclosed embodiments. Additionally, the steps are described as discrete steps merely for the purpose of explanation, and, in some embodiments, multiple steps may be performed simultaneously and/or as part of a single computation. Further, the steps described are not intended to be exhaustive or absolute, and various steps can be inserted or removed.

Figure 3:
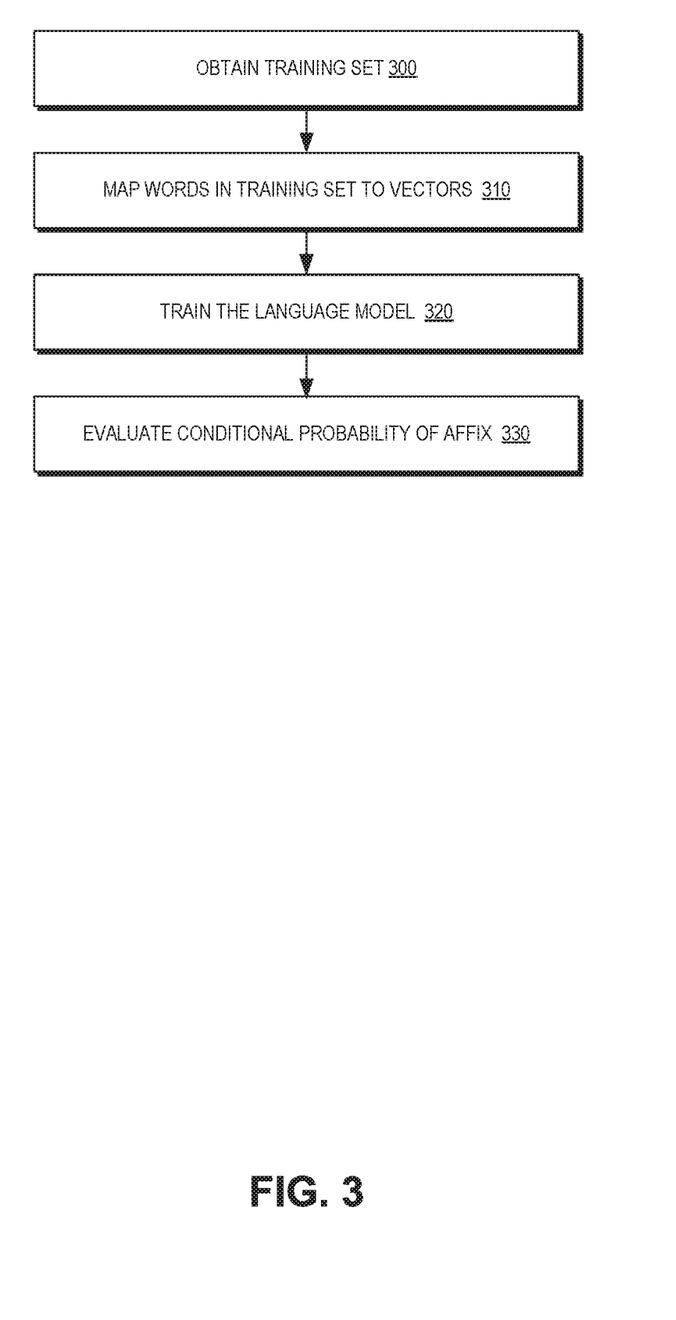
FIG. 3 is a flow diagram illustrating an example process for training a language model and determining conditional probabilities of affixes, consistent with certain disclosed embodiments.

FIG. 3 is a flow diagram illustrating an example process for training a language model and determining conditional probabilities of affixes, consistent with certain disclosed embodiments. In some embodiments, the method described in FIG. 3 can be performed using a computing device such as, for example, a database server, a web server, a mainframe computer, a distributed cluster of computing nodes and/or graphics processing units (GPUs), etc.

In some embodiments, the computing device can be, for example, a domain name registry and/or a name server, and can maintain and/or have access to a database of domain name records. In other embodiments, the computing device can be, for example, a domain name registrar that manages the reservation of domain names.

The process can begin in 300, when the computing device obtains a training set. In various implementations, a training set can represent textual data that is used by the computing device to train a language model.

In some embodiments, the training set can be, for example, a zone file, an online encyclopedia, or other large textual data sets. In further embodiments, the training set can be a subset of a large textual data set, such as, for example, the most common words in the large textual data set (e.g., the K most common words, where K is a user or administrator selected value). The words in the training set can represent the vocabulary of the training set.

In some embodiments, in 310, words in the training set can be mapped to vectors. In some embodiments, the words can be mapped to one-hot vectors. Using one-hot vectors, the dimension of each vector will be the size of the vocabulary (V).

In other embodiments, the training set can be mapped to vectors using pre-build word embeddings (e.g., word2vec, Global Vectors for Word Representation (GloVe), etc.). In further embodiments, the word embeddings can be learned while the language model is trained (e.g., in 330 below). Accordingly, in such embodiments, 310 may not be a separate process, but 310, for example, can be performed as part of 320.

In 320, the computing device can train the language model. In some embodiments, the language model can be trained in an unsupervised manner using stochastic gradient descent on the training set. In further embodiments, the language model can additionally be trained using a hierarchical softmax function and importance sampling methods, and the output of the softmax function can be conditional probabilities (e.g., $P(w_n|w_{n-2}, w_{n-1}, w_{n+1}, w_{n+2})$ P(Target|Context).

In some implementations, the language model can represent a probability distribution over sequences of words from the training set.

For example, a probability distribution can be created by using a linear transformation function on a sequence of vectors. In some embodiments, $P(w_n|w_{n-2}, w_{n-1}, w_{n+1}, w_{n+2})$ can be first computed using a projection layer h: $h^T = [w_{N-2}^T S\ w_{N-1}^T S\ w_{N+1}^T S\ w_{N+2}^T S]$, where S is a matrix of dimension V×E, the rows of S are the word embedding space (E being the size of the word embedding space), and $w_{n-2}$, $w_{n-1}$, $w_{n+1}$, and $w_{n+2}$ are one-hot vector representations of vocabulary words in the context of $w_n$ (vectors of dimension V). Accordingly, h can correspond to the concatenation of the word embedding vectors of the text (dimension 4E for a 5-gram model).

The computing device can then compute the score $o_n$ reflecting how $w_n$ fits in a context. In some embodiments, the score can be computed by applying a linear transformation to h, such that: $o_n = S'_{(.,n)}{}^T \cdot h + b_n$, with $S'_{(.,n)}$ representing the nth column of matrix S' (an E×V matrix) and $b_n$ representing a bias parameter. In further embodiments, a bias vector parameter b can be included in S' by adding an extra column to S' and appending an extra 1 at the end of vector h. In such embodiments, the language model can be a log-linear language model.

In embodiments that use a non-linearity, the score $o_n$ can be computed by applying a non-linear transformation to h, such that: $o_n = S'''_{(.,n)}{}^T \tan h(S''^T h + c) + d_n$, thereby adding a non-linear hidden layer to the neural network. S'' can represent a matrix of dimension E×L, with L being the dimension of the hidden layer, and S''' can represent a matrix of dimension L×V (so $S'''_{(.,n)}$ is the nth column of S''' (e.g., a vector of dimension L)). c can be a bias vector which can be included in S'' as described above, and d can be a bias vector which can be included in S''' as described above.

In some embodiments, a mixed variant may additionally be used: $o_n = S'''_{(.,n)}{}^T \tan h(S''^T h + c) + S'_{(.,n)}{}^T \sim h + d_n$.

The computing device can then map the score to a well formed conditional probability value using a softmax function:

$$P(w_n \mid w_{n-2}, w_{n-1}, w_{n+1}, w_{n+2}) = \frac{\exp(o_n)}{\sum_{i=1}^{|V|} \exp(o_i)}.$$

Additionally, this model can be trained using stochastic gradient descent.

The above example formulas show five-gram word sequences, with $w_n$ representing the third word out of five. However, in various embodiments, probability functions can be performed on sequences of vectors for n-grams of any size. Additionally, $w_n$ can represent a prefix, a suffix, or an affix in any other position.

In some embodiments, the word sequences can include pad vectors (i.e., vectors full of zeros) to fill the space of non-existing input. For example, because the function $P(w_n|w_{n-2}, w_{n-1}, w_{n+1}, w_{n+2})$ is expecting the two words preceding and the two words following the target word, the first two vectors can be filled with zeros in the case where $w_n$ is the prefix (i.e., the two words before do not exist). In the case of a suffix, the two vectors after $w_n$ can be filled with zeros. In the case where two words before and two words after are known (e.g., best italian? in town), padding vectors may not be needed. For example,
P(restaurant|best, Italian, in, town)=0.98.

Example conditional probabilities are presented below for the sake of example:
P(sweet|<pad>, <pad>, chocolate, cake)=0.01943000000
P(perfect|<pad>, <pad>, chocolate, cake)=0.01450000000
P(crying|<pad>, <pad>, chocolate, cake)=0.000000001890

P(match|<pad>, <pad>, chocolate, cake)=0.00000000145.

In some embodiments, syntax may not be very important. Accordingly, in such embodiments, a position independent language model h can be represented by the formula:

$$h = \frac{\sum_{k\ in\ context} w_k^T S}{context\ size},$$

where h, w, and S are vectors.

In various embodiments, 300-320 can represent the process of training the neural network language model using the training set. The language model is not language dependent and can be trained using any language. For example, the language model can be trained for different languages. In other words, values of the parameters S, S", S''', b, c, and d can be obtained for each of the different languages, then the function $P(w_n|w_{n-2}, w_{n-1}, w_{n+1}, w_{n+2})$ can be used to make suggestions, as described with regard to FIGS. 1 and 2.

In 330, the computing device can evaluate the conditional probability of an affix given an input string using the conditional distribution $P(w_n|w_{n-2}, w_{n-1}, w_{n+1}, w_{n+2})$ (i.e., the language model).

In some embodiments, 330 can be performed repeatedly for various affixes in various positions within the input sequence of vectors. The conditional probability values can then be ranked and the top values can be returned. Thus, 330 can represent the process of determining the conditional probabilities of affixes (e.g., words, gTLDs, etc.) using the language model, as described with regard to FIG. 1 (130) and FIG. 2 (230).

While the steps depicted in FIG. 3 have been described as performed in a particular order, the order described is merely an example, and various different sequences of steps can be performed, consistent with certain disclosed embodiments. Additionally, the steps are described as discrete steps merely for the purpose of explanation, and, in some embodiments, multiple steps may be performed simultaneously and/or as part of a single computation. Further, the steps described are not intended to be exhaustive or absolute, and various steps can be inserted or removed.

Figure 4:
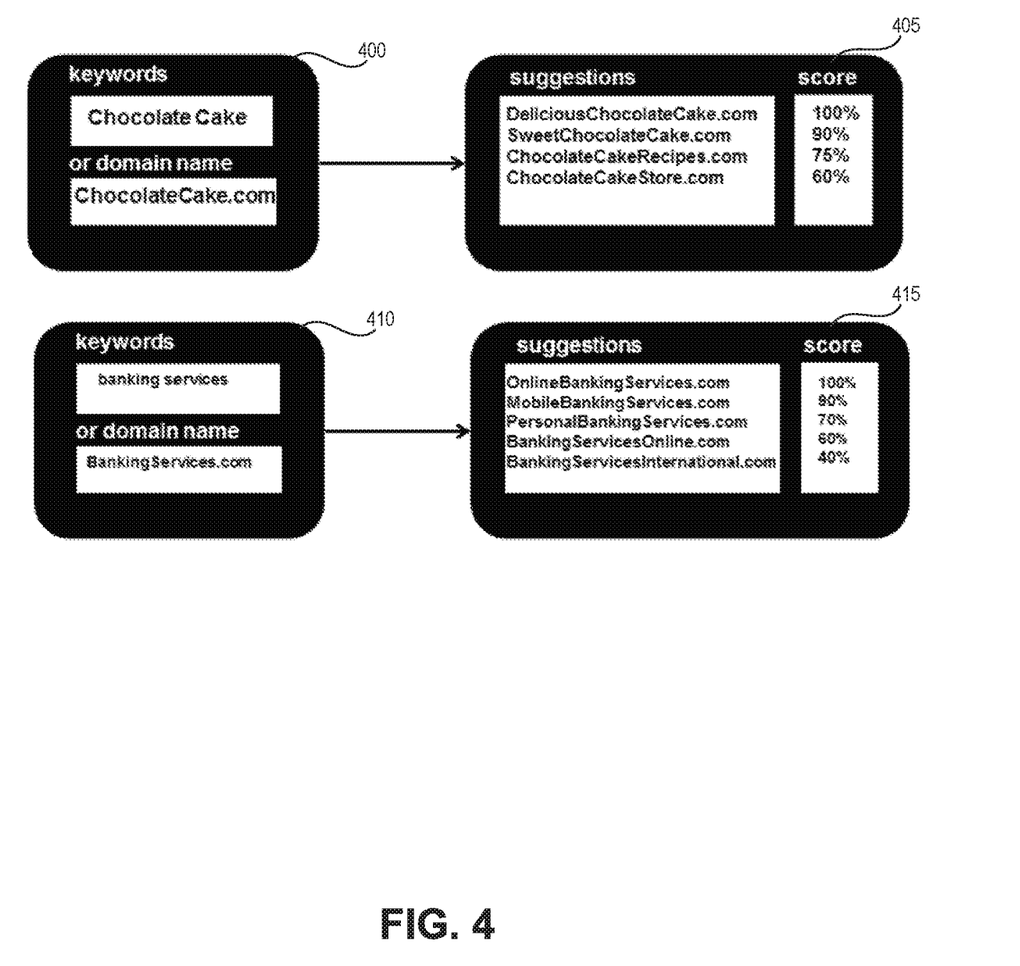
FIG. 4 is a diagram illustrating an example user interface for accepting textual input from a user and presenting domain name suggestions, consistent with certain disclosed embodiments.

FIG. 4 is a diagram illustrating an example user interface for accepting textual input from a user and presenting domain name suggestions, consistent with certain disclosed embodiments.

The example user interface shown in FIG. 4 depicts a user input box 400, a user input box 410, a display box 405, and a display box 415. Using the user input box 400 or the user input box 410, a user can input one or more keywords (e.g., Chocolate Cake) or a domain name (e.g. ChocolateCake.com) as textual data. In some embodiments, the one or more keywords and/or the domain name can represent an indication of words that the user wishes to use in a domain name that may not be available to register with a particular TLD (e.g., .com). For example, the user may have previously attempted to register the domain name ChocolateCake.com, and was informed that the domain name was not available.

The textual data received via the user input box 400 or the user input box 410 can represent the domain name suggestion input (e.g., the textual data) received by the computing device as described with regard to 100 in FIG. 1. Accordingly, the computing device can segment the textual data into tokens, determine a list of affixes, determine conditional probabilities of the affixes using the language model, rank the affixes based on the conditional probabilities, and generate domain name suggestions based on the ranked affixes, as described with regard to 110-150 in FIG. 1.

The computing device can then display the domain name suggestions in the display box 405 and/or the display box 415. Additionally, in some embodiments, the computing device can display the conditional probabilities of the domain name suggestions with the domain name suggestions (e.g., as a "score" of the domain name suggestions).

The example user interface shown in FIG. 4 is merely a simplified example of a user interface that can be used with disclosed embodiments, and is not intended to be limiting.

Figure 5:
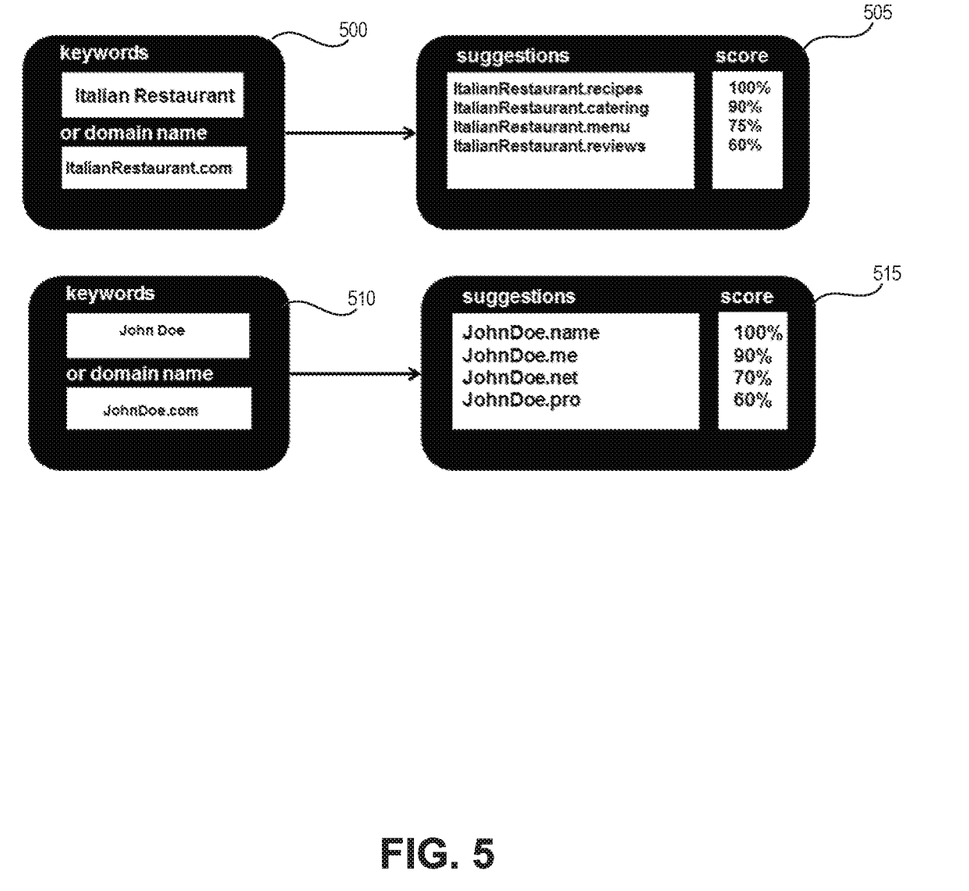
FIG. 5 is a diagram illustrating an example user interface for accepting textual input from a user and presenting domain name suggestions, consistent with certain disclosed embodiments.

FIG. 5 is a diagram illustrating an example user interface for accepting textual input from a user and presenting domain name suggestions, consistent with certain disclosed embodiments.

The example user interface shown in FIG. 5 depicts a user input box 500, a user input box 510, a display box 505, and a display box 515. Using the user input box 500 or the user input box 510, a user can input one or more keywords (e.g., Italian Restaurant) or a domain name (e.g. ItalianRestaurant.com) as textual data. In some embodiments, the one or more keywords and/or the domain name can represent an indication of words that the user wishes to use in a domain name that may not be available to register with a particular TLD (e.g., .com). For example, the user may have previously attempted to register the domain name ItalianRestaurant.com, and was informed that the domain name was not available.

The textual data received via the user input box 500 or the user input box 510 can represent the domain name suggestion input (e.g., the textual data) received by the computing device as described with regard to 200 in FIG. 2. Accordingly, the computing device can segment the textual data into tokens, determine a list of gTLDs, determine conditional probabilities of the gTLDs using the language model, rank the gTLDs based on the conditional probabilities, and generate domain name suggestions based on the ranked gTLDs, as described with regard to 210-250 in FIG. 2.

The computing device can then display the domain name suggestions in the display box 505 and/or the display box 515. Additionally, in some embodiments, the computing device can display the conditional probabilities of the domain name suggestions with the domain name suggestions (e.g., as a "score" of the domain name suggestions).

The example user interface shown in FIG. 5 is merely a simplified example of a user interface that can be used with disclosed embodiments, and is not intended to be limiting.

Figure 6:
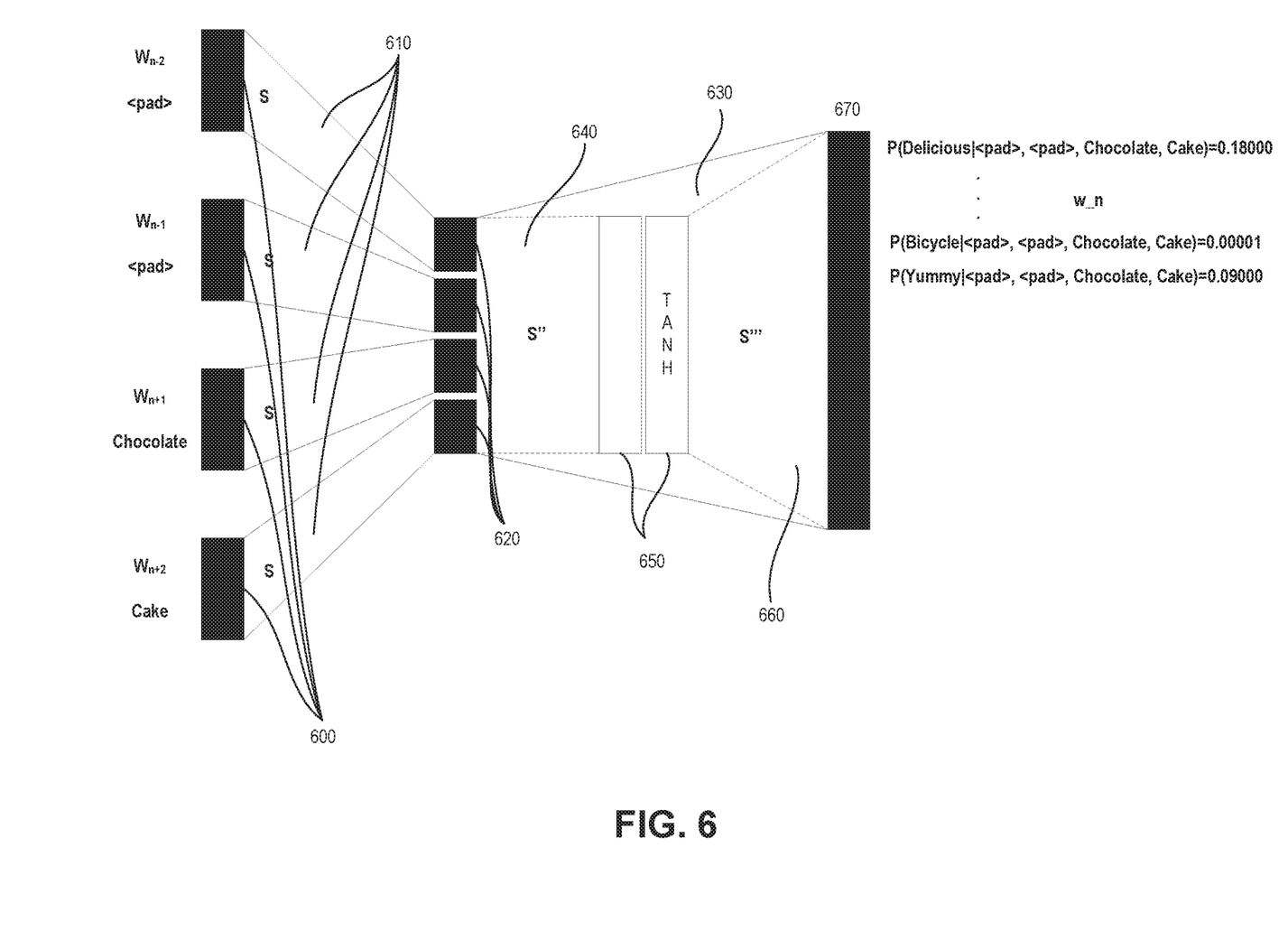
FIG. 6 is a diagram illustrating an example of a topology of a feed-forward neural network language model, consistent with certain disclosed embodiments.

FIG. 6 is a diagram illustrating an example of a topology of a feed-forward neural network language model, consistent with certain disclosed embodiments. As shown in FIG. 6, input words $w_{n-2}$ (<pad>), $w_{n-1}$ (<pad>), $w_{n+1}$ (Chocolate), and $w_{n+2}$ (Cake) can be encoded into one-hot vectors 600. Then linear transformations (610) can be performed on the one-hot vectors in a projection layer 620 (h).

In some embodiments, using a log-linear language model, a linear transformation 630 can then be performed to determine a score, and the score can be mapped to a conditional probability value using a softmax function 670.

In further embodiments, using a non-linear hidden layer, a linear transformation 640 can be performed before using a non-linear transfer function 650, then a linear transformation 660 can be performed to determine a score, and the score can be mapped to a conditional probability value using the softmax function 670.

The topology and example input words and values shown in FIG. 6 are merely an example, and are not intended to be limiting.

Figure 7:
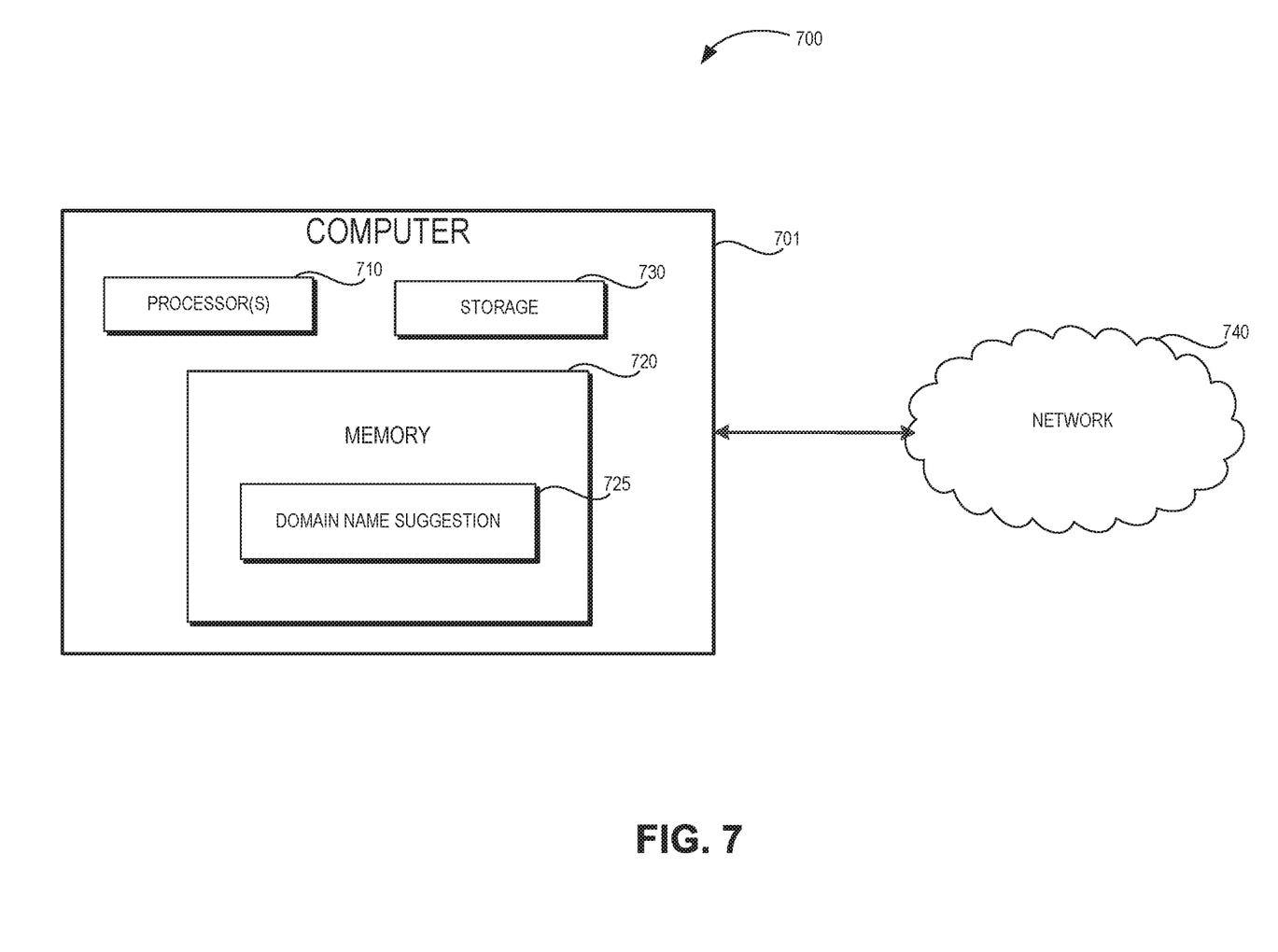
FIG. 7 is a diagram illustrating an example of a hardware system for domain name suggestion, consistent with certain disclosed embodiments.

FIG. 7 is a diagram illustrating an example of a hardware system for domain name suggestion, consistent with certain disclosed embodiments. An example hardware system 700 includes example system components that may be used. The components and arrangement, however, may be varied.

A computer 701 may include a processor 710, a memory 720, a storage 730, and input/output (I/O) devices (not pictured). The computer 701 may be implemented in various ways and can be configured to perform any of the embodiments described above. In some embodiments, the computer 701 can be, for example, a desktop computer, a laptop, a tablet device, a mobile device (e.g., a smartphone), etc. In other embodiments, the computer 701 can be a computing device such as, for example, a database server (e.g., a domain name registry, name server, registrar server, etc.), a web server, a mainframe computer, a distributed cluster of computing nodes and/or graphics processing units (GPUs), etc. The computer 701 may be standalone or may be part of a subsystem, which may, in turn, be part of a larger system.

The processor 710 may include one or more known processing devices, such as a microprocessor from the Intel Core™ family manufactured by Intel™, the Phenom™ family manufactured by AMD™, or the like. The memory 720 may include one or more storage devices configured to store information and/or instructions used by the processor 710 to perform certain functions and operations related to the disclosed embodiments. The storage 730 may include a volatile or non-volatile, magnetic, semiconductor, tape, optical, removable, non-removable, or other type of computer-readable medium used as a storage device. In some embodiments, the storage 730 can include, for example, domain name records (e.g., one or more zone files), language model training sets, etc.

In an embodiment, the memory 720 may include one or more programs or subprograms including instructions that may be loaded from the storage 730 or elsewhere that, when executed by the computer 701, perform various procedures, operations, or processes consistent with disclosed embodiments. For example, the memory 720 may include domain name suggestion program 725 for determining conditional probabilities of domain names, ranking domain names, and/or generating domain name suggestions, according to various disclosed embodiments. The memory 720 may also include other programs that perform other functions, operations, and processes, such as programs that provide communication support, Internet access, etc. The domain name suggestion program 725 may be embodied as a single program, or alternatively, may include multiple sub-programs that, when executed, operate together to perform the function of the domain name suggestion program 725 according to disclosed embodiments. In some embodiments, the domain name suggestion program 725 can perform all or part of the processes of FIGS. 1-3, described above.

The computer 701 may communicate over a link with a network 740. For example, the link may be a direct communication link, a local area network (LAN), a wide area network (WAN), or other suitable connection. The network 740 may include the internet, as well as other networks, which may be connected to various systems and devices.

The computer 701 may include one or more input/output (I/O) devices (not pictured) that allow data to be received and/or transmitted by the computer 701. I/O devices may also include one or more digital and/or analog communication I/O devices that allow the computer 701 to communicate with other machines and devices. I/O devices may also include input devices such as a keyboard or a mouse, and may include output devices such as a display or a printer.

The computer 701 may receive data from external machines and devices and output data to external machines and devices via I/O devices. The configuration and number of input and/or output devices incorporated in I/O devices may vary as appropriate for various embodiments.

Example uses of the system 700 can be described by way of example with reference to the embodiments described above.

While the teachings have been described with reference to the example embodiments, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A system comprising:
   a processing system of a device comprising one or more processors; and
   a memory system comprising one or more computer-readable media, wherein the one or more computer-readable media contain instructions that, when executed by the processing system, cause the processing system to perform operations comprising:
   obtaining a domain name suggestion input comprising textual data;
   segmenting the textual data into one or more tokens;
   obtaining a list of affixes, wherein the list of affixes comprises words from a training set of textual data;
   determining a conditional probability for affixes in the list of affixes using a language model, wherein the language model is trained using the training set of textual data, wherein the conditional probability indicates a desirability rating for a combination of a respective affix in the list of affixes with the textual data;
   ranking the affixes based on the conditional probabilities to generate a ranked list of affixes; and
   generating domain name suggestions based on the ranked list of affixes.

2. The system of claim 1, wherein at least one token of the one or more tokens comprises a plurality of words.

3. The system of claim 1, wherein the list of affixes comprises generic top level domains.

4. The system of claim 1, wherein the language model comprises a feed-forward neural network with one or more non-linear hidden layers.

5. The system of claim 1, wherein the language model comprises a log-linear language model.

6. The system of claim 1, wherein the training set of textual data is a domain name system zone file.

7. The system of claim 1, wherein the conditional probabilities for the affixes are position dependent.

8. The system of claim 1, wherein the conditional probabilities for the affixes are position independent.

9. The system of claim 1, wherein generating domain name suggestions based on the ranked list of affixes comprises generating domain name suggestions based on top ranked affixes.

10. The system of claim 1, wherein generating domain name suggestions based on the ranked list of affixes comprises generating domain name suggestions based on affixes associated with conditional probabilities that meet or exceed a threshold.

11. The system of claim 1, the operations further comprising displaying the domain name suggestions in a browser.

12. A method comprising:
obtaining a domain name suggestion input comprising textual data;
segmenting the textual data into one or more tokens;
obtaining a list of affixes, wherein the list of affixes comprises words from a training set of textual data;
determining a conditional probability for affixes in the list of affixes using a language model, wherein the language model is trained using the training set of textual data, wherein the conditional probability indicates a desirability rating for a combination of a respective affix in the list with the textual data;
ranking the affixes based on the conditional probabilities to generate a ranked list of affixes; and
generating domain name suggestions based on the ranked list of affixes.

13. The method of claim 12, wherein at least one token of the one or more tokens comprises a plurality of words.

14. The method of claim 12, wherein the list of affixes comprises generic top level domains.

15. The method of claim 12, wherein the language model comprises a feed-forward neural network with one or more non-linear hidden layers.

16. The method of claim 12, wherein the language model comprises a log-linear language model.

17. The method of claim 12, wherein the training set of textual data is a domain name system zone file.

* * * * *